(12) United States Patent
Smith

(10) Patent No.: US 7,280,508 B2
(45) Date of Patent: *Oct. 9, 2007

(54) SEPARATION OF PACKET REGISTRATION FROM MOBILE DEVICES

(75) Inventor: Malcolm M Smith, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/531,062

(22) Filed: Sep. 12, 2006

(65) Prior Publication Data

US 2007/0025312 A1   Feb. 1, 2007

Related U.S. Application Data

(63) Continuation of application No. 09/752,912, filed on Dec. 28, 2000, now Pat. No. 7,106,710.

(51) Int. Cl.
*H04Q 7/00* (2006.01)
*H04Q 7/20* (2006.01)
*H04B 7/216* (2006.01)
*H04L 12/66* (2006.01)

(52) U.S. Cl. .............. 370/331; 370/335; 370/342; 370/441; 455/432.1; 455/445

(58) Field of Classification Search .......... None
See application file for complete search history.

(56) References Cited

U.S. PATENT DOCUMENTS

| | | | |
|---|---|---|---|
| 5,793,762 A | 8/1998 | Penners et al. | 370/389 |
| 6,137,791 A | 10/2000 | Frid et al. | 370/352 |
| 6,411,807 B1 | 6/2002 | Amin et al. | 455/432.3 |
| 6,473,413 B1 | 10/2002 | Chiou et al. | 370/331 |
| 6,496,505 B2 | 12/2002 | La Porta et al. | 370/392 |
| 6,539,225 B1 | 3/2003 | Lee | 455/436 |
| 6,567,664 B1 | 5/2003 | Bergenwall et al. | 455/403 |
| 6,611,510 B2 | 8/2003 | Farnolari et al. | 370/335 |
| 6,625,135 B1 | 9/2003 | Johnson et al. | 370/332 |
| 6,665,537 B1 | 12/2003 | Lioy | 455/435 |
| 6,725,044 B2 | 4/2004 | Verma et al. | 455/444 |
| 6,775,253 B1 | 8/2004 | Agrawal et al. | 370/329 |
| 6,788,660 B1 | 9/2004 | Agrawal et al. | 370/331 |

OTHER PUBLICATIONS

Jiang, Zhimei, AT & T Labs Research, "Incorporating Proxy Services into Wide Area Cellular IP Networks."

*Primary Examiner*—Chi Pham
*Assistant Examiner*—Melanie Jagannathan
(74) *Attorney, Agent, or Firm*—Baker Botts L.L.P.

(57) ABSTRACT

A communications system includes an internet protocol (IP) enabled mobile unit having a home network. The system also includes a foreign network that can provide the mobile unit access to IP data services. To allow the mobile unit to receive IP services in the foreign network without an awareness of network mobility, the foreign network registers with the home network to receive redirected packets for communication to the mobile unit.

26 Claims, 2 Drawing Sheets

SEPARATION OF PACKET REGISTRATION FROM MOBILE DEVICES

CROSS-REFERENCE TO RELATED APPLICATION

This application is a continuation of U.S. application Ser. No. 09/752,912 filed Dec. 28, 2000 now U.S. Pat. No. 7,106,710 and entitled "Seperation of Packet Registration From Mobile Devices".

TECHNICAL FIELD OF THE INVENTION

The present invention relates generally to communications systems and more particularly to seperation of packet registration from mobile devices.

BACKGROUND OF THE INVENTION

Internet protocol (IP) networks route packets based on network and subnet identifiers encoded in each packet. Because early IP networks could easily be divided into networks and subnets based on geographic location of equipment and because IP networks developed before widespread deployment of wireless equipment, little or no attention was given to problems associated with moving IP devices. Due to the nature of IP, a device may not attach to a network other than its home network and still receive packets normally. That is, routing protocols, firewalls, and other protocols aimed at error and fraud prevention work together to prevent packets from being delivered to a device not connected to its home network.

To overcome these problems, standards for mobile IP devices have been developed to permit mobile devices to retain a single IP address and yet receive packets when roaming in foreign networks. Specialized mobile IP software, when used by mobile devices, allows the mobile devices to register to receive packets while roaming in a foreign network. As a result of this registration, packets are redirected from the home network of the mobile device to the foreign network using a process known as tunneling. However, mobile IP software has not been widely deployed, since use of mobile IP requires specialized software and, in many cases, may disrupt the operation of other software not specifically designed for use with mobile IP. For example, a standard web browser or voice chat software may not operate properly in a mobile IP environment.

SUMMARY OF THE INVENTION

In accordance with the present invention, techniques for separation of packet registration from mobile devices are provided which substantially eliminate or reduce disadvantages and problems associated with previous techniques. In a particular embodiment, the present invention satisfies a need for mobility of internet protocol (IP) enabled wireless communications devices between networks without requiring the devices to have an awareness of the mobility.

According to one embodiment of the present invention, a communications system includes a mobile unit having an IP address corresponding to a home network and a home agent in the home network. The home agent registers foreign agents to receive redirect packets containing information for delivery to the mobile unit and communicates these redirect packets to registered foreign agents. The system also includes a base transceiver station that receives a device identifier from the mobile unit, identifies the home agent based on the device identifier, and requests subscription information from the home agent, with the subscription information including the IP address of the mobile unit. The base transceiver station also initiates registration of a foreign agent with the home agent based on the subscription information. Thus, the system also includes the foreign agent that registers with the home agent, receives the redirect packets, and communicates information from the redirect packets to the mobile unit using the base transceiver station.

In accordance with another embodiment of the present invention, a method for supporting data communications receives a device identifier from a mobile unit, determines a home agent for the mobile unit based on the device identifier, and requests subscription information from the home agent, with the subscription information including an IP address for the mobile unit. The method also initiates registration of a foreign agent with the home agent, with the registration permitting the foreign agent to receive redirect packets from the home agent. The redirect packets received by the foreign agent from the home agent contain information for communication to the mobile unit. More specifically, the method begins receiving the redirect packets in advance of establishing a data link layer connection with the mobile unit to support a substantially seamless handoff of a data communications session of the mobile unit.

Various embodiments of the present invention provide a number of technical advantages. These techniques support the mobility of IP-enabled mobile communications devices between networks without requiring the devices to have an awareness of the mobility. Thus, neither a mobile device nor its modem needs an awareness of network layer mobility. Rather, the foreign network providing IP access ensures continuity of network connectivity. For example, consider a radio access network (RAN) providing data communications services for a wireless IP-enabled mobile device. Elements within the RAN, upon detecting the mobile device, determine whether the mobile device subscribes to IP services with a remote home network and, if so, register to receive packets from the home network for communication to the mobile device.

Moreover, a wireless network may register in advance of providing data communications services for a mobile device to provide a substantially seamless handoff when initiating data communications services for the mobile device. For example, using these techniques, a wireless network may begin receiving packets for communication to a mobile device in advance of a data link layer handoff of the mobile device to the wireless network. This in-advance registration, in addition to reducing breaks in packet communications, supports time-sensitive and streaming data communications session, such as voice over internet protocol (VoIP) communications. Moreover, these techniques permit wireless networks to make roaming and handoff decisions using traditional techniques, since the mobile devices need not differentiate between wireless data communications sessions and other types of wireless communications.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE DRAWINGS

Figure 1:
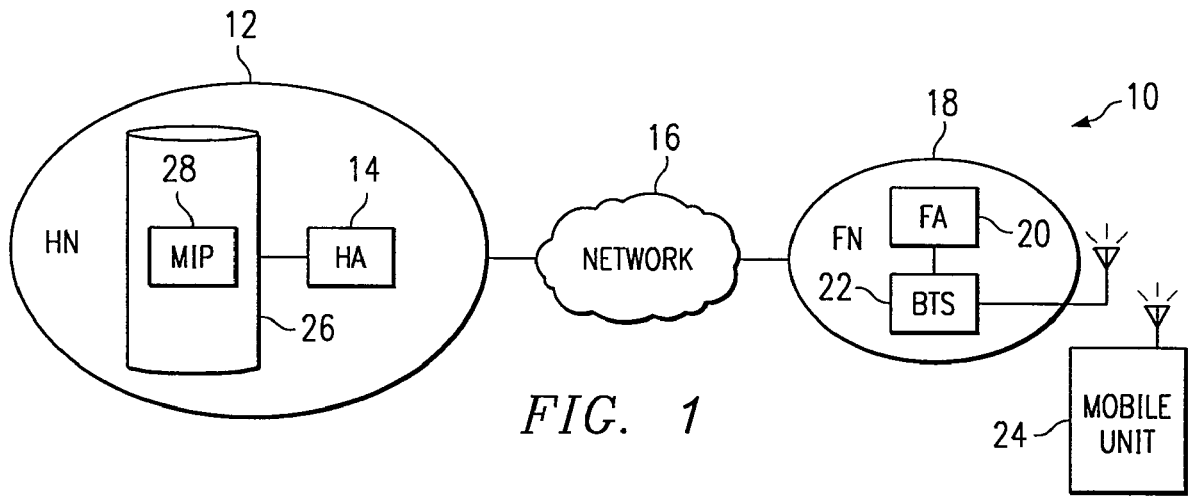
FIG. 1 illustrates a communications system having networks supporting mobility of IP-enabled wireless devices.

FIG. 1 illustrates a communications system, indicated generally at 10, having a home network (HN) 12, which includes a home agent (HA) 14, coupled using a communications network 16 to a foreign network (FN) 18, which includes a foreign agent (FA) 20 and a base transceiver station (BTS) 22. System 10 also includes a mobile unit 24 that is registered for internet protocol (IP) services in home network 12. That is, mobile unit 24 has an IP address with a network identifier that indicates home network 12. In general, foreign network 18 supports IP-enabled wireless communications for mobile unit 24 while mobile unit 24 roams in a service area of foreign network 18. More specifically, elements in foreign network 18 register to receive IP packets from home network 12 for communication to mobile unit 24. The elements in foreign network 18 may register in advance of a handoff of mobile unit 24 into foreign network 18 to support network layer mobility of mobile unit 24. Thus, foreign network 18 supports network layer mobility of mobile unit 24, while mobile unit 24 need not have an awareness of this network layer mobility.

Mobile unit 24 represents any suitable wireless device that provides wireless communications for voice, data, video, signaling, control, telemetry, and/or other transmissions using any suitable wireless communications protocols by establishing wireless links with stations 22. Moreover, mobile unit 24 may support packet-based communication of data packets containing any suitable information. Mobile unit 24 may be an analog or digital cellular telephone, personal digital assistant (PDA), pager, laptop computer, or other suitable wireless device providing wireless services for subscribers. Wireless links represent any channel or channels established between devices for the persistent, periodic, or sporadic communication of information using any suitable wireless communications protocols. Thus, stations 22 represent hardware and/or software supporting wireless links with mobile units 24.

Home network 12 represents any collection and arrangement of communications devices, such as a radio access network (RAN), supporting wireless communications for a particular service area. In this illustration, home network 12 represents the home with respect to mobile unit 24. Thus, in this example, home network 12 represents the network in which mobile unit 24 has subscribed to receive wireless services, including IP communications services. Home network 12 includes devices having addresses that correspond to the network or subnet address assigned to mobile unit 24. For example, home agent 14 and mobile unit 24 each have assigned IP addresses, with the network or subnet portions of these addresses being identical.

Foreign network 18 represents any collection and arrangement of communications devices, such as a RAN, that provides wireless communications services for a particular service area. In this illustration, foreign network 18 represents networks foreign with respect to mobile unit 24. Thus, foreign networks 18 represent wireless networks other than home network 12. Therefore, foreign network 18 includes devices having different network or subnet addresses than mobile unit 24. Foreign network 18 may include any number of stations 22 for establishing wireless links with wireless communications devices, such as mobile unit 24. Thus, foreign network 18 provides wireless services for mobile unit 24 when mobile unit 24 roams into the service of foreign network 18.

Home agent 14 and foreign agent 20 represent communications devices for receiving and transmitting information, such as receiving and transmitting IP packets. Moreover, home agent 14 and foreign agent 20 include hardware and/or software that supports IP communications sessions for mobile unit 24 while mobile unit 24 roams in foreign network 18. In this illustration, home agent 14 and foreign agent 20 are home and foreign with respect to mobile unit 24. That is, home agent 14, foreign agent 20, and mobile unit 24 each have assigned IP addresses that include a network or subnet identifier. The IP addresses of home agent 14 and mobile unit 24 have identical network or subnet identifiers, while the IP address of foreign agent 20 has different network or subnet identifiers.

While mobile unit 24 roams in foreign networks 18, home agent 14 acts as a central point of contact for receiving packets for communication to mobile unit 24. For example, home agent 14 may receive packets addressed to an IP address assigned to mobile unit 24. Home agent 14 then "tunnels" these packets to foreign agents 20 communicating with or likely to communicate with mobile unit 24. Packet tunneling refers to any techniques for bypassing standard routing protocols to deliver packets to a communications device coupled to a network other than its home network. For example, home agent 14 may tunnel packets to foreign agent 20 by encapsulating received data packets in redirect packets that are addressed to foreign agent 20. However, system 10 contemplates home agent 14 using any suitable techniques for generating redirect packets encapsulating information from data packets for mobile unit 24 and communicating these redirect packets to foreign agents 20. Thus, while mobile unit 24 roams in foreign network 18, foreign agent 20 acts as a local point of contact for mobile unit 24. Foreign agent 20 receives redirect packets containing data information for communication to mobile unit 24 from home agent 14 and directs the communication of this information to mobile unit 24 by stations 22.

Communications between elements of home network 12 and foreign network 18 take place using communications network 16. Communications network 16 may include any collection and arrangement of hardware and/or software for communicating information between multiple devices. For example, communications network 16 may be one or a collection of components associated with the public switched telephone network (PSTN), local area networks (LANs), wide area networks (WANs), a global computer network such as the Internet, or any other communications equipment suitable for providing wireless and/or wireline communications.

To support IP data services for mobile unit 24, home agent 14 may couple to a memory 26 that, in this example, includes mobile IP information 28. Memory 26 represents any collection and arrangement of volatile or non-volatile, local or remote devices suitable for storing data, for example, random access memory (RAM) devices, read only memory (ROM) devices, magnetic storage devices, optical storage devices, or any other suitable data storage devices. Thus, system 10 may distribute memory 26 among one or more components, including within home agent 14. Mobile IP information 28 represents data providing address information for mobile devices serviced by home agent 14. According to a particular embodiment, this includes information associating mobile devices, by device identifiers, with IP addresses. For example, an entry in mobile IP information 28 may identify mobile unit 24 by a device identifier and include an IP address assigned to mobile unit 24. Upon receiving an appropriate request, home agent 14 may access mobile IP information 28 to determine an IP address associated with a particular device identifier. For example, station 22 may determine a device identifier for a mobile unit 24 and request an IP address associated with that device identifier from home agent 14.

In operation, elements in foreign network 18 provide wireless services for mobile unit 24, including wireless IP data services. Foreign network 18 supports network layer mobility for mobile unit 24 by detecting mobile unit 24, determining an IP address associated with mobile unit 24, and registering to receive redirected data packets from home agent 14. According to a particular embodiment, station 22 detects mobile unit 24 when mobile unit 24 moves into or near a service area of foreign network 18. Station 22 may detect mobile unit 24 using any suitable cellular triggers. For example, station 22 may detect when mobile unit 24 turns on, when mobile unit 24 registers with station 22, when the signal strength received from mobile unit 24 exceeds some threshold, or may detect any other suitable trigger. In detecting mobile unit 24, station 22 determines a device identifier for mobile unit 24. The device identifier represents any information for identifying mobile unit 24, such as a mobile identification number (MIN), an equipment serial number (ESN), or other suitable identifier. Station 22 may receive the device identifier from mobile unit 24, for example, as part of a request to register received from mobile unit 24.

After determining the device identifier for mobile unit 24, station 22 determines the home IP network for mobile unit 24, which in this case is home network 12. Station 22 also determines whether mobile unit 24 subscribes to IP data services and, if so, determines the IP address associated with mobile unit 24. For example, using the device identifier, station 22 may determine an IP address for home agent 14 and request subscription information for mobile unit 24 from home agent 14. In response to this request, home agent 14 may access mobile IP information 28 to determine whether mobile unit 24 subscribes to IP data services and, if so, to determine the IP address associated with mobile unit 24. Home agent 14 may then return this subscription information to station 22.

Before returning subscription information, home agent 14 may perform authentication on station 22. For example, station 22 may provide cellular authentication parameters and perform challenge/response procedures with home agent 14. According to a particular embodiment, station 22 and home agent 14 perform authentication procedures that do not require access to IP data session information for mobile unit 24, such as access to point-to-point protocol (PPP) passwords or mobile IP hash information. However, system 10 contemplates station 22 using any suitable techniques to determine the IP address associated with mobile unit 24. Thus, station 22 may maintain a local database linking device identifiers with home agent addresses and assigned IP addresses.

After determining the IP address of mobile unit 24 and the IP address of home agent 14, station 22 initiates registration of foreign agent 20 to receive redirect packets from home agent 14. According to a particular embodiment, station 22 communicates the IP address of home agent 14 and the IP address of mobile unit 24 to foreign agent 20. Foreign agent 20 uses this information to register to receive redirect packets containing information for communication to mobile unit 24. According to a particular embodiment, foreign agent 20 uses the IP address of home agent 14 and the IP address for mobile unit 24 to request the establishment of a tunnel from home agent 14 to foreign agent 20. For example, foreign agent 20 may communicate a tunnel establishment request to home agent 14 that includes the IP address of mobile unit 24 and an IP address for foreign agent 20.

Responsive to this request, home agent 14, using any suitable techniques, registers foreign agent 20 to receive redirect packets containing information for communication to mobile unit 24. During a communications session, home agent 14 receives data packets containing information for communication to mobile unit 24. These data packets may contain any suitable information, such as voice information, data, video, audio, images, and/or other appropriate information. Upon receiving data packets addressed to mobile unit 24, home agent 14 tunnels these packets to foreign agent 20. For example, home agent 14 may encapsulate the data packets within redirect packets addressed to foreign agent 20. However, as previously discussed, home agent 14 may use any suitable method for encapsulating information from received data packets into redirect packets. For example, home agent 14 may aggregate received packets, parse received packets, readdress received packets, extract information from received packets, or otherwise modify received packets when reforming these packets as redirect packets.

Because foreign agents 20 may register with home agent 14 at any time, home agent 14 and foreign agent 20 may establish a tunnel in advance of mobile unit 24 roaming into foreign network 18. Thus, foreign network 18 may begin receiving packets for communication to mobile unit 24 in advance of actually servicing a data communications session for mobile unit 24. This supports a virtually seamless handoff of mobile unit 24 into foreign network 18 and helps to prevent loss of packets during a data communications session. Moreover, these techniques permit foreign networks 18 to handle network layer mobility for mobile devices without requiring mobile devices to have an awareness of network layer mobility. More specifically, mobile devices need not register with home agent 14 or foreign agents 20 in order to receive IP communications while roaming in foreign networks 18.

While the preceding examples focused on specific separations of functions between home agent 14, foreign agent 20, and station 22, system 10 contemplates any suitable distribution of functions between various elements. More specifically, system 10 contemplates any appropriate distribution of the functions described for foreign agent 20 and station 22 among elements in foreign network 18. Thus, foreign agent 20 may perform many of the functions described for station 22, and/or station 22 may perform many of the functions described for foreign agent 20. That is, system 10 contemplates any suitable distribution of functionalities between elements to separate packet registration from mobile unit 24.

Figure 2:
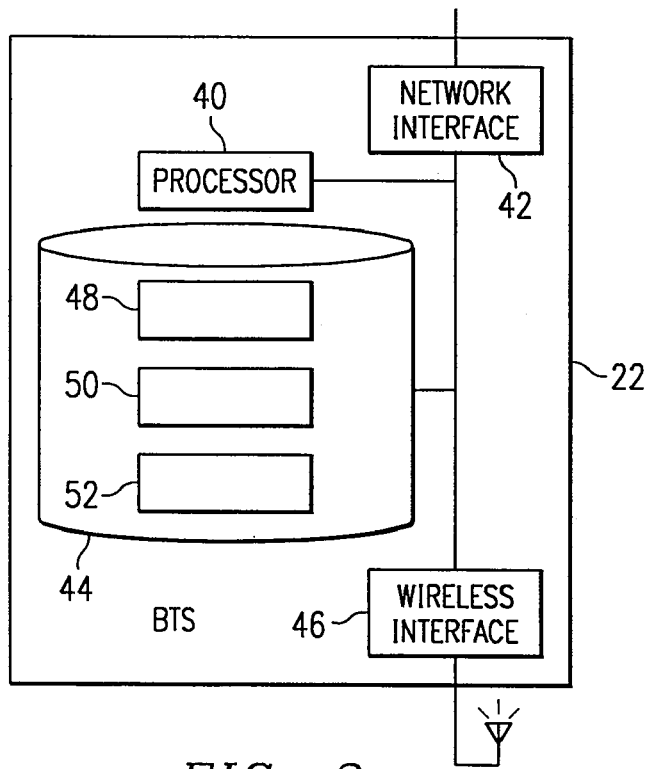
FIG. 2 is a block diagram illustrating a base transceiver station from the system.

FIG. 2 illustrates functional elements of an exemplary base transceiver station 22 that include a processor 40, a network interface 42, a memory 44, and a wireless interface 46. In general, station 22 provides wireless services, including IP data services, for local and foreign mobile devices. For foreign devices having IP data services, station 22 supports network layer mobility, allowing foreign mobile devices to operate without an awareness of network layer mobility. More specifically, station 22 initiates registration with home network 12 of a foreign device to insure network layer connectivity upon commencing to provide wireless services to the foreign device.

Processor 40 controls the management and operation of station 22 by accessing information stored using memory 44, using network interface 42 to communicate with other devices, and using wireless interface 46 to communicate with mobile devices such as mobile unit 24. As with memory 26, memory 44 represents any suitable local or remote data storage devices. In this example, memory 44 stores applications 48, agent information 50, and mobile device information 52. Applications 48 represent software, code, logic, and/or other suitable modules for use by processor 40 in controlling the operation of station 22. Agent information 50 includes information for use by station 22 in identifying foreign agent 20 to service wireless communications for foreign mobile devices such as mobile unit 24. For example, agent information 50 may include an IP address for foreign agent 20.

Mobile device information 52 includes information for determining home agent 14 for a mobile device based on some device identifier. For example, mobile device information 52 may include an entry for mobile unit 24 that includes the device identifier for mobile unit 24 and a corresponding IP address for home agent 14. According to a particular embodiment, mobile device information 52 includes a home location register (HLR) and a visitor location register (VLR) for identifying local and foreign wireless devices. However, while this FIGURE illustrates specific information stored by memory 44, system 10 contemplates station 44 storing any suitable information using any appropriate data storage techniques. Thus, for example, station 22, using memory 44, may also store information such as that included in mobile IP information 28. Therefore, in addition to identifying home agent 14 by device identifier, station 22, using memory 44, may also identify an IP address for a mobile device based on a device identifier.

In operation, station 22 provides wireless communications services for mobile devices using wireless interface 46. To provide these wireless services, station 22 detects mobile devices as they enter into a service area of station 22. As previously discussed, station 22 may use any suitable criteria and triggers to detect mobile devices. Upon detecting a mobile device, station 22 attempts to identify the mobile device, for example, by requesting a device identifier from the mobile device. Using the device identifier, station 22 accesses mobile device information 52 to determine home network 12 for the mobile device. For example, upon determining a device identifier for mobile unit 24, station 22 may use the device identifier to determine an IP address for home agent 14. Among other things, this permits station 22 to determine whether the mobile device is a local or a foreign mobile device. For local mobile devices, station 22 need not provide any specialized registration for IP data services, since the mobile device is within its home service network.

For foreign mobile devices, station 22 determines whether the foreign mobile device has subscribed to IP data services and, if so, determines an IP address for the foreign mobile device. According to a particular embodiment, station 22 contacts home agent 14 for the foreign mobile device to obtain subscription information, with the subscription information including the IP address assigned to the mobile device. However, as previously discussed, station 22 may access any suitable database to determine subscription information for foreign mobile devices. Thus, station 22 may maintain mobile IP information 28 using memory 44 to permit station 22 to determine an IP address for foreign mobile devices without contacting home network 12.

Using the subscription information for a foreign mobile device, station 22 initiates registration of foreign agent 20 to receive redirect packets from home agent 14. According to a particular embodiment, station 22 communicates the IP address of the foreign mobile device and the IP address of the associated home agent 14 to foreign agent 20, and foreign agent 20 uses this information in addition to an IP address for foreign agent 20 to request tunneling of redirect packets from home agent 14 to foreign agent 20. At this point, foreign agent 20 may begin receiving redirect packets from home agent 14 containing data packets or other information for communication to the mobile device. Foreign agent 20 and station 22 may coordinate using any suitable techniques to communicate the information encapsulated within the redirect packets to the mobile device using any suitable wireless communications protocols.

While this example includes specific functional elements for station 22, system 10 contemplates station 22 containing any collection and arrangement of elements. Moreover, system 10 contemplates implementing the functionalities of station 22 using any suitable distribution or separation of functionalities and components among devices at one or more locations. For example, foreign agent 20 may implement some or all of the functions of station 22. Also, system 10 contemplates station 22 performing additional functions, such as those of foreign agent 20. For example, station 22 may register with home agent 14 to receive tunneled packets containing data packets for communication to mobile devices. In addition, system 10 contemplates implementing each of the functional elements within station 22 using any suitable combination and arrangement of hardware and/or software and implementing any of the functionalities using a computer program stored on a computer readable medium.

Figure 3:
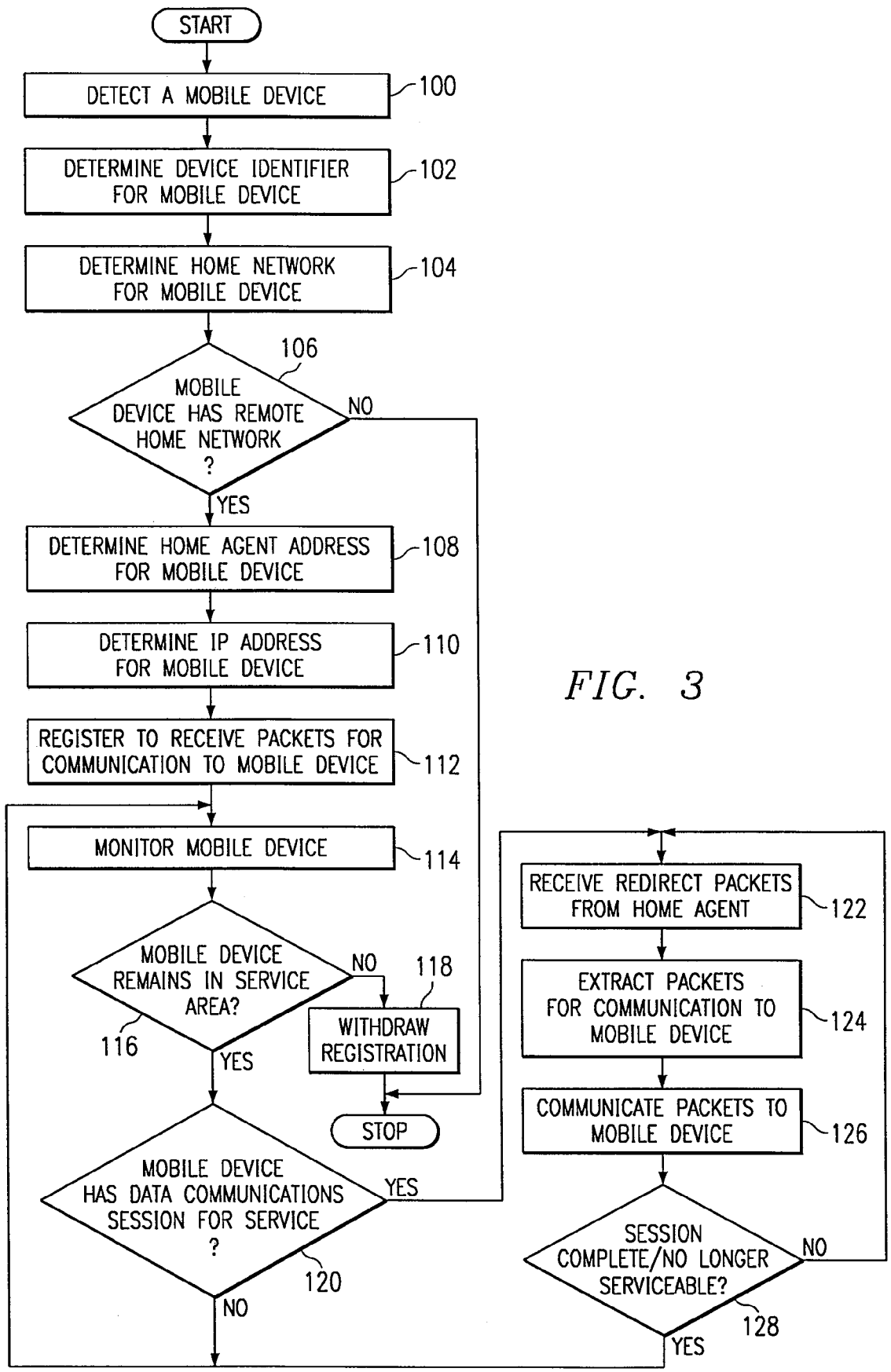
FIG. 3 is a flowchart of a method for supporting mobility of IP-enabled wireless devices.

FIG. 3 is a flowchart illustrating the operation of elements in foreign network 18 in supporting network layer mobility for mobile devices. This flowchart provides exemplary methods of operation for foreign agent 20 and stations 22. Moreover, this flowchart illustrates the operation of elements upon detecting a mobile device subscribed to receive IP data services.

Station 22 detects a mobile device at step 100 and determines a device identifier for the mobile device at step 102. As previously discussed, station 22 may use any suitable techniques or cellular triggers to detect a mobile device and to determine a device identifier for the mobile device. Using the device identifier, station 22 determines home network 12 for the mobile device at step 104. If the mobile device has a remote home network 12, as determined at step 106, station 22 need not provide specialized registration for the mobile device to receive IP data services. However, if the mobile device has a home network 12, station 22 determines an address for home agent 14 of the mobile device at step 108.

In addition, station 22 determines an IP address for the mobile device at step 110. As previously discussed, station 22 may use the device identifier to determine the address of home agent 14 and then to request subscription information from home agent 14 based on the device identifier for the mobile device. Alternatively, station 22 may use the device identifier for the mobile device to determine the address of home agent 14 and the IP address for the mobile device by accessing local memory 44. Using the address of home agent 14 and the IP address for the mobile device, station 22 initiates registration of foreign network 18 to receive redirect packets from home agent 14. Thus, according to this embodiment, foreign agent 20 registers to receive redirect packets containing data packets for communication to the mobile device at step 112. Moreover, during this setup, station 22 and/or foreign agent 20 may perform authentication procedures with home agent 14 to verify foreign agent 20 as an authorized recipient of redirect packets for the mobile device. However, as previously discussed, system 10 contemplates any suitable distribution of functions between foreign agent 20 and station 22. Thus, station 22 may handle some or all of the functions described for foreign agent 20, such as registration to receive redirect packets from home agent 14.

While the mobile device remains in the service area of foreign network 18, station 22 monitors the mobile device at step 114 and determines whether the mobile device remains in the service area at step 116. However, while this flowchart focuses on the operation of a single station 22, it should be understood that foreign network 18 may contain any number of stations 22 serviced by one or more foreign agents 20. Thus, the service area of foreign network 18 may represent the area covered by any number of stations 22 under the control of one or more foreign agents 20. If the mobile device moves outside of the service area or otherwise loses contact with stations 22, foreign network 18 withdraws registration from home agent 14 at step 118. In withdrawing the registration, foreign network 18 discontinues the tunneling of packets for the mobile device from home agent 14 to foreign agent 20.

However, if the mobile device remains in the service area of station 22, foreign network 18 determines whether the mobile device has a data communications session for service at step 120. If not, station 22 continues monitoring the mobile device at step 114. However, to service a data communication session, foreign agent 20 receives tunneled redirect packets from home agent 14 at step 122. These redirect packets may contain any suitable information for communication to the mobile device that have been received by home agent 14. For example, these redirect packets may encapsulate data packets addressed to the mobile device that have been received by home agent 14. Thus, foreign agent 20 may extract these data packets for communication to the mobile device at step 124 and then coordinate with station 22 to communicate the data packets to the mobile device at step 126.

This redirection of packets from home agent 14 to foreign agent 20 allows the mobile device to receive packets addressed to an IP address specifying a network remote from the current network providing access. Therefore, foreign network 18 provides network layer mobility for the mobile device, while allowing the mobile device to operate without an awareness of this network layer mobility. During the data communication session, foreign network 18 monitors whether the session is complete or no longer serviceable at step 128. As long as the session is not complete and remains serviceable, foreign network 18 continues receiving redirect packets from home agent 14 and communicating information from these packets to the mobile device at steps 122-126. However, upon session completion or when the session is no longer serviceable, foreign network 18 attempts to continue monitoring the mobile device at step 114 and, if the mobile device has moved out of the service area, withdraws from registration to receive redirect packets at step 118. Also, foreign agent 20 may receive redirect packets before beginning to provide service to the mobile device. In this case, foreign agent 20 may discard received packets until establishing service for the mobile device.

While this flowchart illustrates an exemplary method of operation for various elements of foreign network 18, system 10 contemplates foreign agent 20 and stations 22 using any suitable techniques for supporting network mobility of mobile devices. Thus, many of the steps in this flowchart may take place simultaneously and/or in different orders than is shown. Moreover, as previously discussed, foreign network 18 may use any suitable distribution of functions between elements to support network mobility of mobile devices. Also, system 10 contemplates foreign agent 20 and stations 22 using methods with additional steps, fewer steps, and different steps, so long as the methods remain appropriate for supporting network mobility of mobile devices.

In addition, while the methods, techniques, and equipment described in the preceding figures illustrate network mobility for wireless mobile devices, system 10 contemplates using similar techniques to provide network mobility for any suitable IP-enabled device. For example, using these techniques, system 10 may provide network mobility for devices such as laptop computers coupled to foreign networks, without requiring the IP-enabled devices to have an awareness of network mobility. Therefore, system 10 contemplates using these techniques to provide network layer mobility for devices regardless of the method of attachment to the network, be it wireless or wireline, or the protocols used for communications.

Although the present invention has been described in several embodiment, a myriad of changes and modifications may be suggested to one skilled in the art, and it is intended that the present invention encompass such changes and modifications as fall within the scope of the present appended claims.

What is claimed is:

1. A system for providing data communications comprising:
    a mobile unit operable to communicate wirelessly;
    a home agent associated with the mobile unit, the home agent operable to register one or more foreign agents to receive packets for delivery to the mobile unit and to communicate a packet destined for the mobile unit to the registered foreign agent; and
    a base transceiver station in a foreign network operable to:
        detect that the mobile unit has entered a geographic area associated with the base transceiver station without receiving a registration request from the mobile unit;
        in response to detecting that the mobile unit has entered the geographic area, identify the home agent associated with the mobile unit based on a device identifier of the mobile unit; and
        initiate registration of a foreign agent with the home agent; and
    wherein the home agent is further operable to forward packets destined for the mobile unit to the foreign agent after registration.

2. The system of claim 1, wherein the base transceiver station is further operable to initiate registration of the foreign agent prior to establishing a data-link layer connection with the mobile unit.

3. The system of claim 2, wherein:
    the base transceiver station comprises a first base transceiver station; and
    the first base transceiver station is further operable to initiate a substantially seamless handoff of a data communications session of the mobile unit between a second base transceiver station and the first base transceiver station.

4. The system of claim 1, wherein the base transceiver station is operable to initiate registration by:
  generating a registration request, the registration request comprising an internet protocol (IP) address of the mobile unit and an IP address of the foreign agent; and
  transmitting the registration request to the home agent.

5. The system of claim 1, further comprising the foreign agent, and wherein:
  the base transceiver station is further operable to initiate registration of the foreign agent by communicating an internet protocol (IP) address of the home agent to the foreign agent; and
  the foreign agent is operable to transmit a registration request to the home agent in response to receiving the IP address from the base transceiver station.

6. The system of claim 5, wherein the base transceiver station is operable to:
  determine the home agent associated with the mobile unit by:
    receiving a device identifier from the mobile unit; and
    identifying, based on the device identifier, an IP address of the home agent associated with the mobile unit; and
  communicate the IP address of the home agent to the foreign agent by communicating the identified IP address to the foreign agent.

7. The system of claim 1, wherein the mobile unit comprises a portable computer.

8. The system of claim 1, wherein the mobile unit comprises a personal digital assistant (PDA).

9. The system of claim 1, wherein the mobile unit comprises a mobile phone that supports packet-based data communications.

10. The system of claim 1, wherein, after the base transceiver station initiates registration, the home agent is operable to:
  receive data packets destined for the mobile unit;
  encapsulate the data packets; and
  transmit the encapsulated data packets to the foreign agent.

11. The system of claim 10, wherein the foreign agent is further operable to:
  receive the encapsulated packets;
  extract data packets from the encapsulated data packets; and
  transmit the extracted data packets to the base transceiver station for transmission to the mobile unit.

12. A method for providing data communications, comprising:
  detecting, at a base transceiver station, that a mobile unit has entered a geographic area associated with the base transceiver station without the base transceiver station receiving a registration request from the mobile unit;
  in response to detecting that the mobile unit has entered the geographic area, determining a home agent associated with the mobile unit based on a device identifier of the mobile unit;
  initiating, at the base transceiver station, registration of a foreign agent with the home agent; and
  forwarding packets destined for the mobile unit from the home agent to the foreign agent after registration of the foreign agent.

13. The method of claim 12, wherein initiating registration of the foreign agent comprises initiating registration of the foreign agent prior to establishing a data-link layer connection between the base transceiver station and the mobile unit.

14. The method of claim 13, wherein the base transceiver station comprises a first base transceiver station, and further comprising initiating a substantially seamless handoff of a data communications session of the mobile unit between a second base transceiver station and the first base transceiver station.

15. The method of claim 12, wherein initiating registration comprises:
  generating a registration request at the base transceiver station, wherein the registration request comprises an internet protocol (IP) address of the mobile unit and an IP address of the foreign agent; and
  transmitting the registration request from the base transceiver station to the home agent.

16. The method of claim 12, wherein initiating registration of the foreign agent comprises:
  communicating an internet protocol (IP) address of the home agent from the base transceiver station to the foreign agent;
  generating, at the foreign agent, a registration request in response to receiving the IP address from the base transceiver station, the registration request comprising the IP address of the mobile unit and an IP address of the foreign agent; and
  transmitting the registration request from the foreign agent to the home agent.

17. The method of claim 16, wherein:
  determining the home agent associated with the mobile unit comprises:
    receiving, at the base transceiver station, a device identifier from the mobile unit; and
    identifying, based on the device identifier, an IP address of the home agent associated with the mobile unit; and
  communicating the IP address of the home agent to the foreign agent comprises communicating the identified IP address to the foreign agent.

18. The method of claim 12, wherein the mobile unit comprises a portable computer.

19. The method of claim 12, wherein the mobile unit comprises a personal digital assistant (PDA).

20. The method of claim 12, wherein the mobile unit comprises a mobile phone that supports packet-based data communications.

21. The method of claim 12, further comprising:
  receiving data packets at the home agent after initiating registration, wherein the data packets are destined for the mobile unit;
  encapsulating the data packets; and
  transmitting the encapsulated data packets from the home agent to the foreign agent.

22. The method of claim 21, further comprising:
  receiving the encapsulated packets at the foreign agent;
  extracting data packets from the encapsulated data packets; and
  transmitting the extracted data packets to the base transceiver station for transmission to the mobile unit.

23. A base transceiver station comprising:
  a wireless interface operable to wirelessly communicate with a mobile unit; and
  a processor operable to:
    detect that the mobile unit has entered a geographic area associated with the base transceiver station without the base transceiver station receiving a registration request from the mobile unit;
    in response to detecting that the mobile unit has entered the geographic area, determine a home agent associated with the mobile unit based on a device identifier of the mobile unit; and
initiate registration of a foreign agent with the home agent.

24. The base transceiver station of claim 23, wherein the processor is operable to initiate registration of the foreign agent by initiating registration of the foreign agent prior to establishing a data-link layer connection between the base transceiver station and the mobile unit.

25. The base transceiver station of claim 24, wherein the processor is further operable to initiate a substantially seamless handoff of a data communications session of the mobile unit between another base transceiver station and the base transceiver station.

26. A system for providing data communications, comprising:

means for detecting, at a base transceiver station, that a mobile unit has entered a geographic area associated with the base transceiver station without the base transceiver station receiving a registration request from the mobile unit;
means for determining, in response to detecting that the mobile unit has entered the geographic area, a home agent associated with the mobile unit based on a device identifier of the mobile unit;
means for initiating, at the base transceiver station, registration of a foreign agent with the home agent; and
means for forwarding packets destined for the mobile unit from the home agent to the foreign agent after registration of the foreign agent.

* * * * *